United States Patent
Henry et al.

(10) Patent No.: US 7,210,266 B2
(45) Date of Patent: May 1, 2007

(54) PLANT ROOT PRUNING CONTAINER

(75) Inventors: James H Henry, West Palm Beach, FL (US); Elona T Henry, West Palm Beach, FL (US)

(73) Assignee: Nursery Supplies, Inc., Chambersburg, PA (US)

( * ) Notice: Subject to any disclaimer, the term of this patent is extended or adjusted under 35 U.S.C. 154(b) by 0 days.

(21) Appl. No.: 11/110,882

(22) Filed: Apr. 21, 2005

(65) Prior Publication Data

US 2005/0246960 A1    Nov. 10, 2005

Related U.S. Application Data

(60) Provisional application No. 60/568,260, filed on May 6, 2004.

(51) Int. Cl.
*A01G 9/02* (2006.01)
*A01G 23/02* (2006.01)

(52) U.S. Cl. .......................... 47/73; 47/32.7
(58) Field of Classification Search ............... 47/65.5, 47/66.1, 66.3, 32.7
See application file for complete search history.

(56) References Cited

U.S. PATENT DOCUMENTS

| | | | |
|---|---|---|---|
| 608,590 A | 8/1898 | Freund | |
| 879,753 A * | 2/1908 | Eckert | 220/8 |
| 1,093,873 A * | 4/1914 | Mitchell | 220/8 |
| D167,009 S | 6/1952 | Tersini | |
| 2,859,557 A * | 11/1958 | Lattuca | 47/65.5 |
| 3,693,396 A | 9/1972 | Bertelson et al. | |
| 3,785,088 A | 1/1974 | Guarriello | |
| 4,043,077 A | 8/1977 | Stonehocker | |
| 4,159,597 A | 7/1979 | Olsen | |
| 4,183,175 A * | 1/1980 | Magee | 47/79 |
| 4,216,621 A | 8/1980 | Olsen et al. | |
| 4,341,040 A | 7/1982 | Smith | |
| 4,510,712 A | 4/1985 | Whitcomb | |
| 4,753,037 A | 6/1988 | Whitcomb | |
| 4,939,865 A | 7/1990 | Whitcomb et al. | |
| 4,972,627 A | 11/1990 | Hori et al. | |
| 5,007,135 A | 4/1991 | Rigsby | |
| 5,099,607 A | 3/1992 | Lawton | |
| 5,241,784 A | 9/1993 | Henry | |
| 5,557,886 A * | 9/1996 | Whitcomb | 47/73 |
| 5,683,762 A | 11/1997 | Banschick | |
| 5,761,848 A * | 6/1998 | Manlove | 47/65.5 |
| 6,032,409 A | 3/2000 | Obonai et al. | |
| 6,071,574 A | 6/2000 | Weder | |

(Continued)

FOREIGN PATENT DOCUMENTS

CA     1061564     9/1979

(Continued)

*Primary Examiner*—Son T. Nguyen
(74) *Attorney, Agent, or Firm*—Drinker Biddle & Reath LLP

(57) ABSTRACT

A air root pruning container for plants includes a side wall made of a plurality of segments extending in layers above a base wall with each segment having a larger radius as measured from a central axis than the subjacent segment and with the segments being separated from adjacent segments to provide air root pruning openings between the segments; each segment includes outwardly curved wall portions so that the interior wall surfaces will guide root development to an opening.

13 Claims, 2 Drawing Sheets

U.S. PATENT DOCUMENTS

| | | |
|---|---|---|
| 6,190,783 B1 | 2/2001 | Weder |
| 6,221,000 B1 | 4/2001 | Weder |
| 6,266,921 B1 | 7/2001 | Keskilohko |
| 6,277,472 B1 | 8/2001 | Weder |
| 6,357,179 B1 * | 3/2002 | Buss .................... 47/65.5 |
| 6,365,241 B2 | 4/2002 | Weder |
| 6,402,675 B2 | 6/2002 | Weder |
| 6,427,378 B1 | 8/2002 | Obonai et al. |
| 6,638,584 B1 | 10/2003 | Weder |
| 6,989,056 B2 * | 1/2006 | Babler .................... 106/413 |
| 2001/0009091 A1 | 7/2001 | Weder |
| 2001/0041246 A1 | 11/2001 | Weder |
| 2002/0134013 A1 | 9/2002 | Obonai et al. |
| 2003/0027702 A1 | 2/2003 | Weder |
| 2003/0078151 A1 | 4/2003 | Weder |
| 2005/0100684 A1 | 5/2005 | Weder |

FOREIGN PATENT DOCUMENTS

| | | |
|---|---|---|
| EP | 0322179 | 12/1989 |
| EP | 0240365 | 7/1991 |
| EP | 0575298 | 12/1993 |
| EP | 0602744 | 3/1998 |
| EP | 0861586 | 11/2003 |
| WO | WO 93/03602 | 3/1993 |

* cited by examiner

US 7,210,266 B2

PLANT ROOT PRUNING CONTAINER

This application claims the benefit of U.S. Provisional Patent Application No. 60/568,260, entitled "Plant Root Pruning Container" filed on May 6, 2004 by the instant inventor, the disclosure of which is incorporated by reference.

FIELD OF THE INVENTION

The present intervention provides an air root pruning container for plants, such as trees, shrubs and flowering plants, where the structure of the container includes the handling of the roots for a great variety of plants and which is easily manufactured and capable of stacking for ease of storage of the containers. In addition, the structure of the container will facilitate removal of a plant growth from the container when this is desired.

BACKGROUND OF THE INVENTION

Plants and shrubs cultivated for commercial sale have been grown in containers in nurseries for many years. Some of the chief benefits of the container use has been the conservation of water, efficient use of land and substantially enhanced control over the development of the plant by providing an optimal growth environment, ready access to the medial in which the plant is to grow. Moreover, these containers provide ease of transportability from a nursery to a point of sale while minimizing damage to the plant. As is well-known, the use of containers in nurseries and farms to develop plants for commercial sale has enjoyed widespread use in the nursery industry as a result of the economic cost benefit resulting from conservation of the soil and water necessary to plant development during growth from seedling to a plant ready for marketing.

One such container that has enjoyed widespread success in this industry is that disclosed in U.S. Pat. No. 5,241,784 granted Sep. 7, 1993. In this patent, a circular container is provided with a corrugated sidewall to encourage a lateral directional root growth for the plant with roots being directed toward a plurality of apertures provided in the sidewall. Once a root reaches an aperture, it ceases to grow since it is exposed to air and prevented from growing due to the absence of soil thereby creating enhanced lateral root development. The container, however, was relatively expensive to manufacture and store due to its initial configuration.

A number of attempts have been made in the prior art, to solve the air root pruning requirement for commercial plant growing, but none to my knowledge have achieved as efficient pruning of roots, prevention of defective root development and enhancements of root form as the structure disclosed in the aforementioned U.S. patent.

SUMMARY THE INVENTION

The present intervention provides an improved air root pruning container that is much easier to manufacture and store for retailers while providing the air root pruning features in a more efficient manner than heretofore available. In one embodiment, the sidewall of the generally circular container is divided into sections or layers, which are separated from each other by bridging members, which are spaced about the periphery of the sidewall, thereby providing the necessary gaps for air root pruning and creating more directional guidance of lateral roots to air pruning slots or openings. However, each layer or portion of the sidewall is of increasing radius from the bottom to the open upper edge of the container. This will permit accommodation of roots that tend to grow downwardly in a number of plants that are of commercial interest and where guidance to an available air root pruning slot is to be effective. Each layer includes arcuate sections between the bridging members to thereby provide the directional guidance to the roots of a plant placed in the container. With this structure, therefore, the manufacturing step of cutting individual apertures in a sidewall is avoided, while assuring the provision of an adequate number of apertures for the air root operation. In addition, the structure will have an overall taper to provide ready nesting of containers, which is highly desired by retailers. Also, a number of manufacturing techniques can be utilized to produce the container of the present invention. In each case, these will prove more cost-effective than was the case with the prior air root pruning containers. Other advantages will become apparent as consideration is given to the following description and drawings.

BRIEF DESCRIPTION OF THE DRAWINGS

A preferred embodiment of the present invention is shown in the accompanying drawings, wherein.

DETAILED DESCRIPTION OF THE INVENTION

Figure 1:
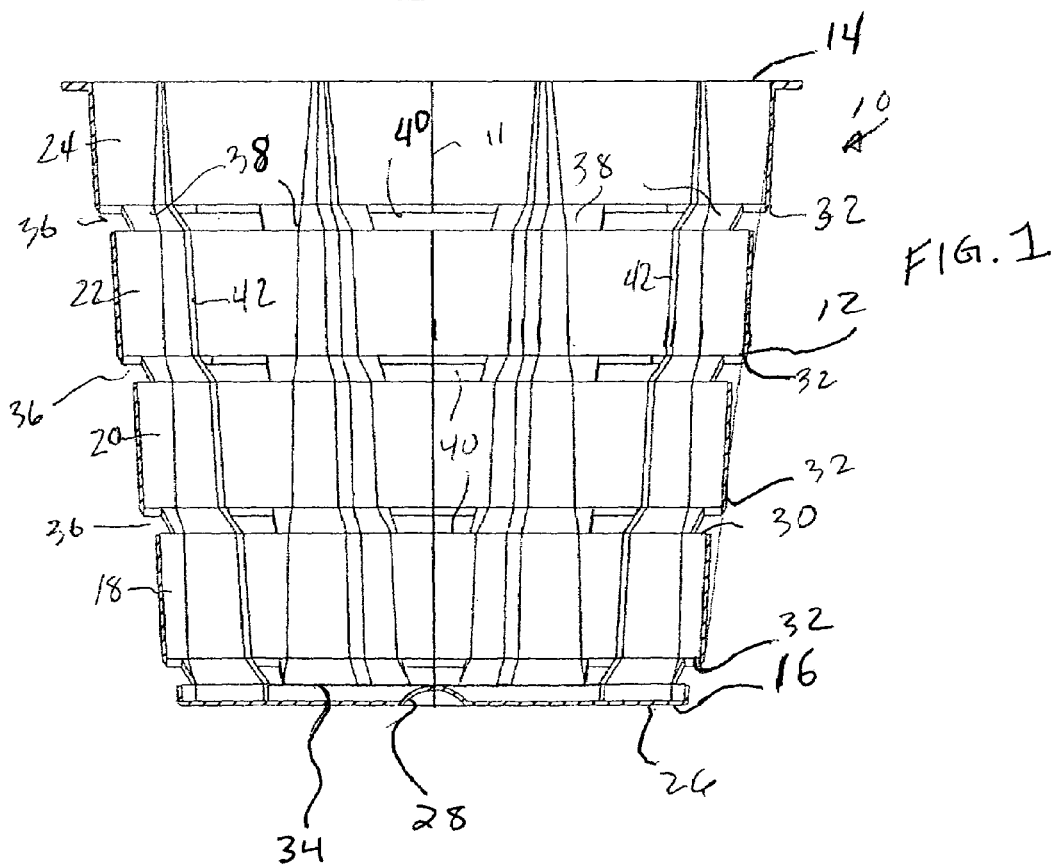
FIG. 1 is a sectional view of the container in elevation taken along lines 1—1 of FIG. 2.

With reference to the drawings, there is shown in FIG. 1, a sectional view of the container at 10 which has a sidewall 12, a top edge 14 and a bottom wall 16. The sidewall 12 comprises a plurality of the portions or segments 18, 20, 22 and 24, as illustrated. It will be understood, of course, that fewer or more segments may be utilized depending, for example, on the size of the container being utilized. The base segment, 26 includes the base or bottom wall 16, which may be perforated or imperforate, which is typically desired by users to prevent bottom root matting or alternatively to prevent roots from penetrating the soil. At its central point, an indentation 28 is provided to facilitate nesting with an identically formed container 10. Each of the segments 18 to 24 will have, as shown, an upper edge 30 and a lower edge 32 and a slight outward taper from lower edge 32 to the edge 30, as shown. As one moves up from the base segment 26, the radii of each of the segments increases as shown in FIG. 1. Thus, the lower edges 32 of each segment will overhang the upper edge 30 of the immediately sub-adjacent segment. This will provide a gap 36 between each of the segments, as shown. The face of each gap 36 will lie in a surface whose axis intersects the container's axis 11 at the same angle for each layer or segment. To maintain the spacing between the segments 18, 20, 22 and 24, a plurality of bridge members, 38 extend from the upper edge 30 of each segment to the immediately adjacent lower edge, 32 about the circumference of the container 10.

The segments of the sidewall 12 are symmetrical about the central axis 11, which extends substantially perpendicularly from the bottom wall 16. It will be noted that each bridge member slopes outwardly to accommodate the greater radial dimension of the immediately super adjacent segment. The circumferential width of each of the bridge members may be selected to vary the size of the openings 40 provided between each of the bridge members 38, at each level of the container. When ease of manufacture is paramount, the bridge members are formed uniformly distributed about the axis 11 in each segment level. This will provide stability for the resulting container 10.

Figure 2:
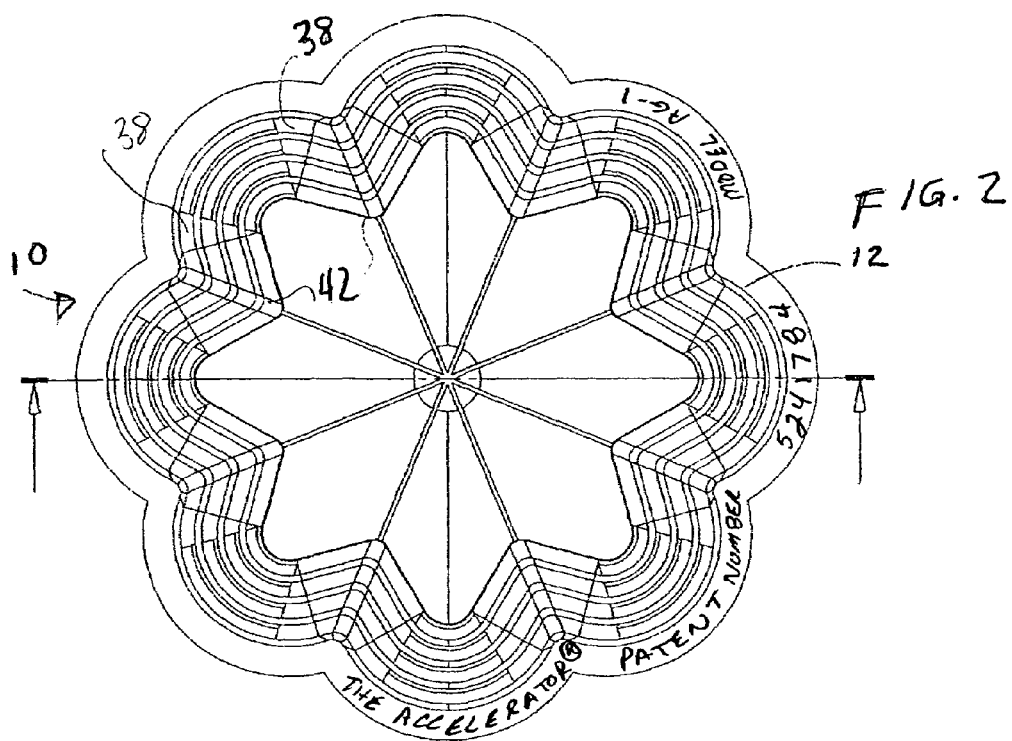
FIG. 2 is a top plan view of the container of FIG. 1.

As shown more clearly in FIG. 2, each series of the bridge members 38 are formed with a rib 42 which extends the height of the container. The ribs 42 thus contribute to the rigidity of the container and to guiding the lateral growing root tips to the available slot for air root pruning.

The wall sections between the ribs 42 are each arcuately shaped outwardly relative to the interior of the container 10 for the purpose of propagating the growth of the roots towards the gaps 36 during the course of a plant's development. The ribs and gaps will cooperate to reduce or prevent the amount of spiral and/or circular root growth, while the radial offset between the segments will also prevent downward root growth.

Typically, the container 10 will be made from a plastic material such as high density polyethylene and polypropylene, which can be molded, punched, stretched and/or cut to provide the illustrated structure. Other materials may, of course, be used.

Figure 3:
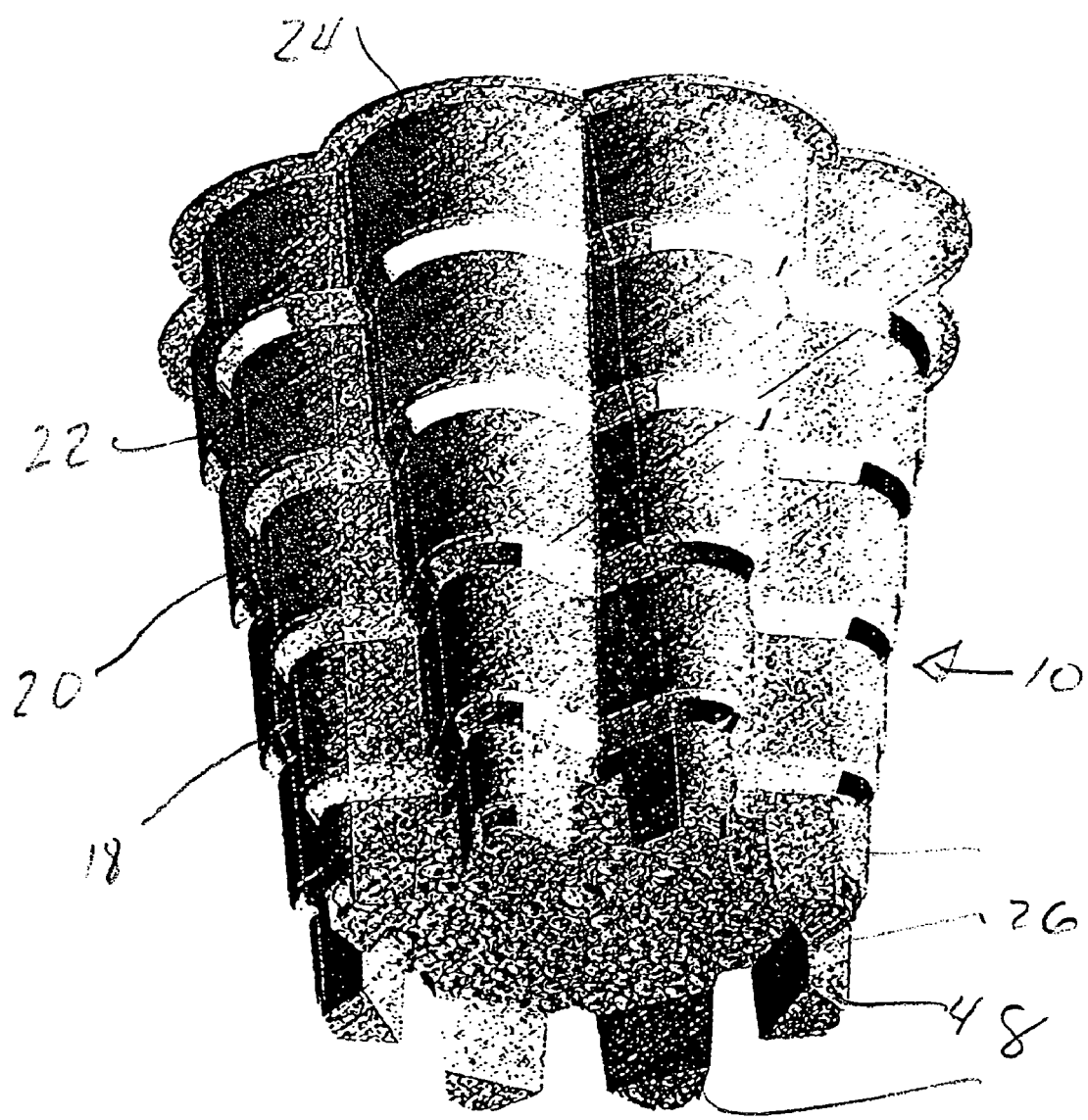
FIG. 3 is a perspective view of a modified container showing the bottom wall with integral support legs.

In FIG. 3, there is shown a perspective view of an alternate embodiment of the container 10 where support legs 48 are provided spaced about the periphery of the edge. With openings provided in the bottom wall 26, the presence of the legs 48 will allow air root pruning to occur on the bottom of the container to thereby avoid root growth into the soil on which the container may be placed. Also, the space under the container provided by the legs 48 permits cooling air flow under the container to reduce the temperature of the root ball in the container. Also, to assist in temperature control, the resin used to manufacture the container should be light colored and even highly reflective such as a metallic pigment to reduce heat absorption from the sunlight. Added temperature control is achieved by the reduction in the radius of each segment below the top edge of the container 10 whereby the upper segment provides shade for the lower segments of the side wall during most of the daylight hours, and the full length of each outer corrugation creates a shade area on the adjacent inner corrugation, varying by the angle of the exposure to direct sun light.

Having described the invention, it will be apparent to the skills in this technology, the various modifications may be made to the illustrated embodiment within the spirit and scope of the invention described and claimed.

What is claimed is:

1. A container for enclosing the roots and root tips of a plant intended to be transplanted and for receiving growing medium, including the plant root and root tips and comprising opposite top and bottom edges and a bottom wall, a side wall extending between said top and bottom edges, said side wall surrounding a central axis of said container with said axis extending centrally and perpendicularly from said bottom wall, said sidewall being divided into a plurality of layers spaced along said axis with the layer adjacent said bottom edge having a selected radius, the radius of each succeeding layer increasing in size up to the layer adjacent said top edge, each said layer having an upper edge and a lower edge and with the adjacent edges of adjacent layers being spaced apart a selected distance by at least one bridging member, thereby defining a gap between the edges of said layers, the top edge of some of said layers being connected to the lower edge of some of said layers by a said bridging member that slopes outwardly relative to the central axis from said upper edge to said lower edge, said upper edge at a position relative to said lower edge that is closer to the central axis and that is closer to the bottom wall, and said bridging members between two adjacent layers being spaced apart from each other about said axis, wherein each said layer includes a plurality of ribs spaced apart circumferentially about said central axis at the selected radius, a pair of said ribs partially defining a panel portion, and each said panel portion being curved outwardly relative to said selected radius.

2. The container as claimed in claim 1, wherein said lower edge is spaced from said bottom wall and is connected to said bottom wall by spaced apart bridging members.

3. The container as claimed in claim 2 wherein said bottom wall includes openings for root pruning.

4. The container as claimed in claim 1 wherein supporting legs extend from said bottom wall to space said bottom wall from a surface.

5. The container as claimed in claim 4 wherein said bottom wall includes openings for root pruning.

6. The container as claimed in claim 1 wherein said top edge of said container includes a flange extending outwardly relative to said central axis.

7. The container as claimed in claim 1 wherein between each said layer, a plurality of bridging members are provided.

8. The container as claimed in claim 7 wherein said plurality of said bridging members are uniformly spaced about said axis.

9. The container as claimed in 1 wherein said container is made from a material selected from the group comprising polyethylene and polypropylene.

10. The container as claimed in claim 1 wherein the container includes a reflective coating.

11. The container as claimed in claim 1 wherein the container is made of a material with pigment.

12. A plant root pruning container comprising:
    a base comprising a bottom wall;
    a top edge; and
    a sidewall extending from the base to the top edge, the side wall oriented about a central axis of the container, the central axis extending centrally and perpendicularly from the base, the sidewall comprising:
    a plurality of layers, each layer comprising:
        a plurality of ribs spaced apart circumferentially about the central axis at a selected radius, each pair of consecutive ribs defining endpoints of an arcuate panel extending outwardly relative to the selected radius, the selected radius of each succeeding layer from the base to the top edge increasing in length; and
        an upper edge and a lower edge; and
    a plurality of bridging members connecting a portion of the upper edge of each layer other than the top layer with the lower edge of the immediately adjacent layer, the upper edge at a position, relative to the lower edge to which the bridging member connects, that is closer to the central axis and that is closer to the base such that the bridging members slope outwardly relative to the central axis, wherein the bridging members define a plurality of gaps between the layers.

13. A plant root pruning container comprising:
    a base comprising a bottom wall;
    a top edge; and
    a sidewall extending from the base to the top edge, the side wall oriented about a central axis of the container, the central axis extending centrally and perpendicularly from the base, the sidewall comprising:

a plurality of layers forming steps in the axial direction, each layer including:

a plurality of arcuate shaped portions, each arcuate shaped portion having a radius that is less than the maximum distance from the central axis to the radially furthest point on that layer such that the arcuate portions form a series of lobed protrusions on each layer spaced apart circumferentially about the layer, the radius of the arcuate portion on a layer closer to the base being less than the radius of an arcuate portion further from the base; and an upper edge and a lower edge; and a plurality of bridging members connecting a portion of the upper edge of each layer other than the top layer with the lower edge of the immediately adjacent layer, the upper edge at a position, relative to the lower edge to which the bridging member connects, that is closer to the central axis and that is closer to the base such that the bridging members slope outwardly relative to the central axis, wherein the bridging members define a plurality of gaps between the layers.

* * * * *